United States Patent [19]

Wood et al.

[11] Patent Number: 4,804,206
[45] Date of Patent: Feb. 14, 1989

[54] SWIVEL CONSTRUCTION AND METHOD OF MAKING THE SAME

[75] Inventors: Chester W. Wood, Milford, Ohio; Frank G. Lamping, Bellevue, Ky.

[73] Assignee: Dover Corporation, New York, N.Y.

[21] Appl. No.: 107,975

[22] Filed: Oct. 13, 1987

[51] Int. Cl.⁴ .......................... F16L 27/08; F16L 35/00
[52] U.S. Cl. ........................................ 285/13; 285/93; 285/276; 285/321
[58] Field of Search .................... 285/13, 924, 276, 93, 285/321

[56] References Cited

U.S. PATENT DOCUMENTS

| | | | |
|---|---|---|---|
| 1,902,697 | 3/1933 | Ellingsen | 285/276 |
| 2,688,500 | 9/1954 | Scott | 285/13 |
| 2,916,043 | 12/1959 | Rickard | 285/13 X |
| 3,089,713 | 5/1963 | Scaramucci | 285/924 X |
| 3,558,163 | 1/1971 | Moore et al. | 285/168 |
| 4,079,969 | 3/1978 | Wilson et al. | 285/276 X |
| 4,611,834 | 9/1986 | Rabinovich | 285/131 |
| 4,615,547 | 10/1986 | Sutcliffe et al. | 285/276 X |
| 4,707,000 | 11/1987 | Torgardh | 285/924 X |

Primary Examiner—Thomas F. Callaghan
Attorney, Agent, or Firm—Kinney & Schenk

[57] ABSTRACT

A swivel construction and method of making the same are provided, the construction comprising a body member and an adaptor member, each member having opposed ends and having a passage passing through the ends thereof, one end of the body member and one end of the adaptor member being disposed in telescoped relation, the construction having a retainer disposed between the telescoped ends and tending to hold the members in the telescoped relation while permitting swivel movement therebetween, the construction having a seal disposed between the telescoped ends and tending to seal the telescoped ends together while permitting swivel movement therebetween, the construction having a bearing disposed between the telescoped ends and intermediate the retainer and the seal, the construction having structure for causing the seal to leak a certain amount after the retainer has worn away the bearing a certain amount but is still maintaining the one ends in the telescoped relation thereof.

18 Claims, 6 Drawing Sheets

SWIVEL CONSTRUCTION AND METHOD OF MAKING THE SAME

BACKGROUND OF THE INVENTION

1. Field of the Invention

This invention relates to a new swivel construction, such as a swivel construction for interconnecting a gasoline dispensing nozzle construction to its gasoline supply hose, and to a new method of making such a swivel construction.

2. Prior Art Statement

It is known to provide a swivel construction comprising a body member and an adaptor member, each member having opposed ends and having a passage passing through the ends thereof, one end of the body member and one end of the adaptor member being disposed in telescoped relation, the construction having retaining means disposed between the telescoped ends and tending to hold the members in the telescoped relation while permitting swivel movement therebetween, the construction having seal means disposed between the telescoped ends and tending to seal the telescoped ends together while permitting swivel movement therebetween. For example, see the U.S. patent to Moore et al, U.S. Pat. No. 3,558,163 and the U.S. patent to Rabinovich, U.S. Pat. No. 4,611,834.

SUMMARY OF THE INVENTION

It is one feature of this invention to provide a new swivel construction that has unique means for signaling that part of the structure thereof has been so worn away that such swivel construction should be replaced.

In particular, it was found according to the teachings of this invention that unique means could be provided for permitting the seal means of a swivel construction to leak a certain amount after the retaining means of the construction has worn away a bearing means thereof a certain amount but is still maintaining the construction in its assembled relation so that the leaking fluid will indicate to a user that the swivel construction should be replaced.

For example, one embodiment of this invention provides a swivel construction comprising a body member and an adaptor member, each member having opposed ends and having a passage passing through the ends thereof, one end of the body member and one end of the adaptor member being disposed in telescoped relation, the construction having retaining means disposed between the telescoped ends and tending to hold the members in the telescoped relation while permitting swivel movement therebetween, the construction having seal means disposed between the telescoped ends and tending to seal the telescoped ends together while permitting swivel movement therebetween, the construction having bearing means disposed between the telescoped ends and intermediate the retaining means and the seal means, the construction having means for causing the seal means to leak a certain amount after the retaining means has worn away the bearing means a certain amount but is still maintaining the one ends in the telescoped relation thereof.

Accordingly, it is an object of this invention to provide a new swivel construction having one or more of the novel features of this invention as set forth above or hereinafter shown or described.

Another object of this invention is to provide a new method of making such a swivel construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

While the various features of this invention are hereinafter illustrated and described as being particularly adapted to provide a swivel construction for a fluid dispensing nozzle construction utilized for dispensing fuel into the fill pipes of the gasoline storage tanks on automobiles and the like at conventional filling stations and the like, it is to be understood that the various features of this invention can be utilized singly or in various combinations thereof to provide a swivel construction for conveying other fluids as desired.

Therefore, this invention is not to be limited to only the embodiments illustrated in the drawings, because the drawings are merely utilized to illustrate one of the wide variety of uses of this invention.

Figure 1:
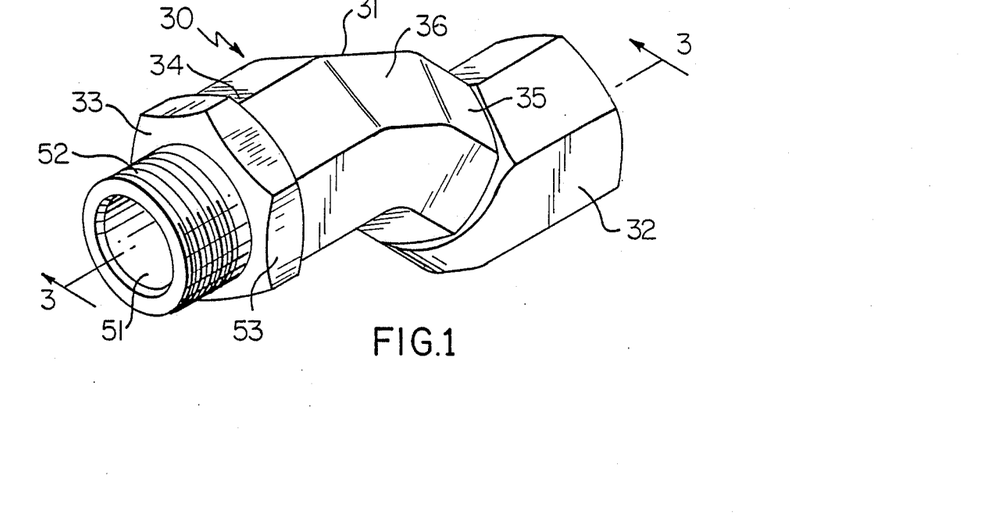
FIG. 1 is a perspective view of the new swivel construction of this invention.
Figure 2:
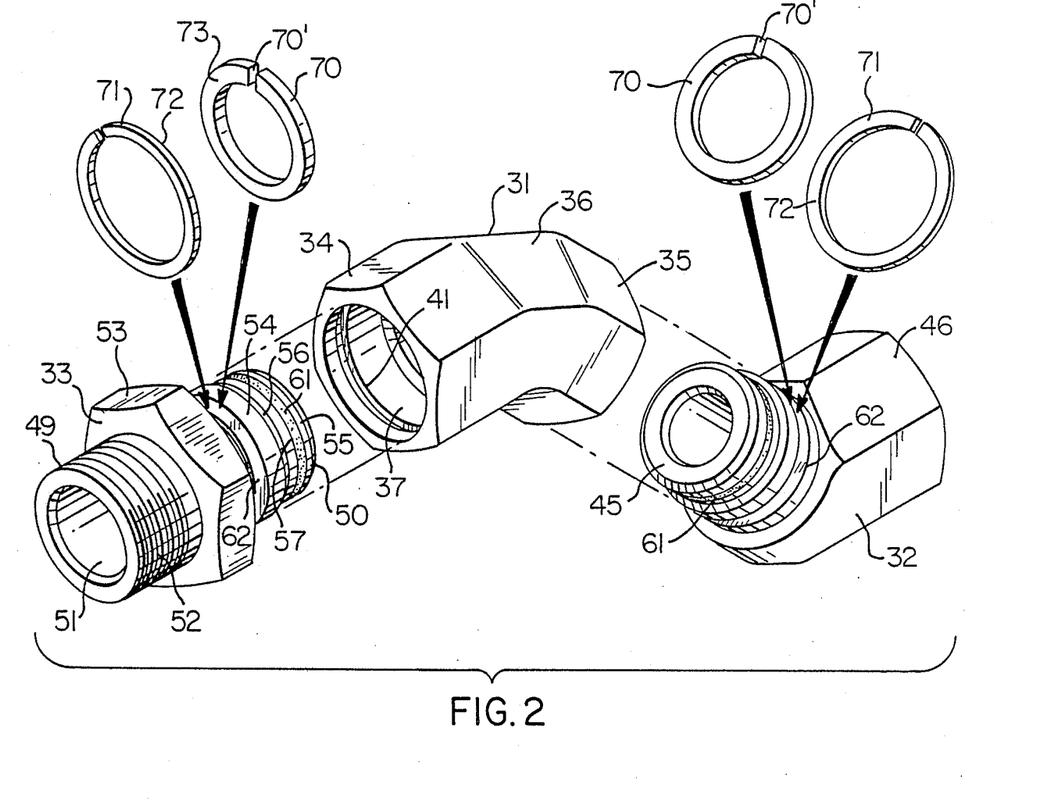
FIG. 2 is an exploded perspective view of the various parts of the swivel construction of FIG. 1.
Figures 3, 4, 5:
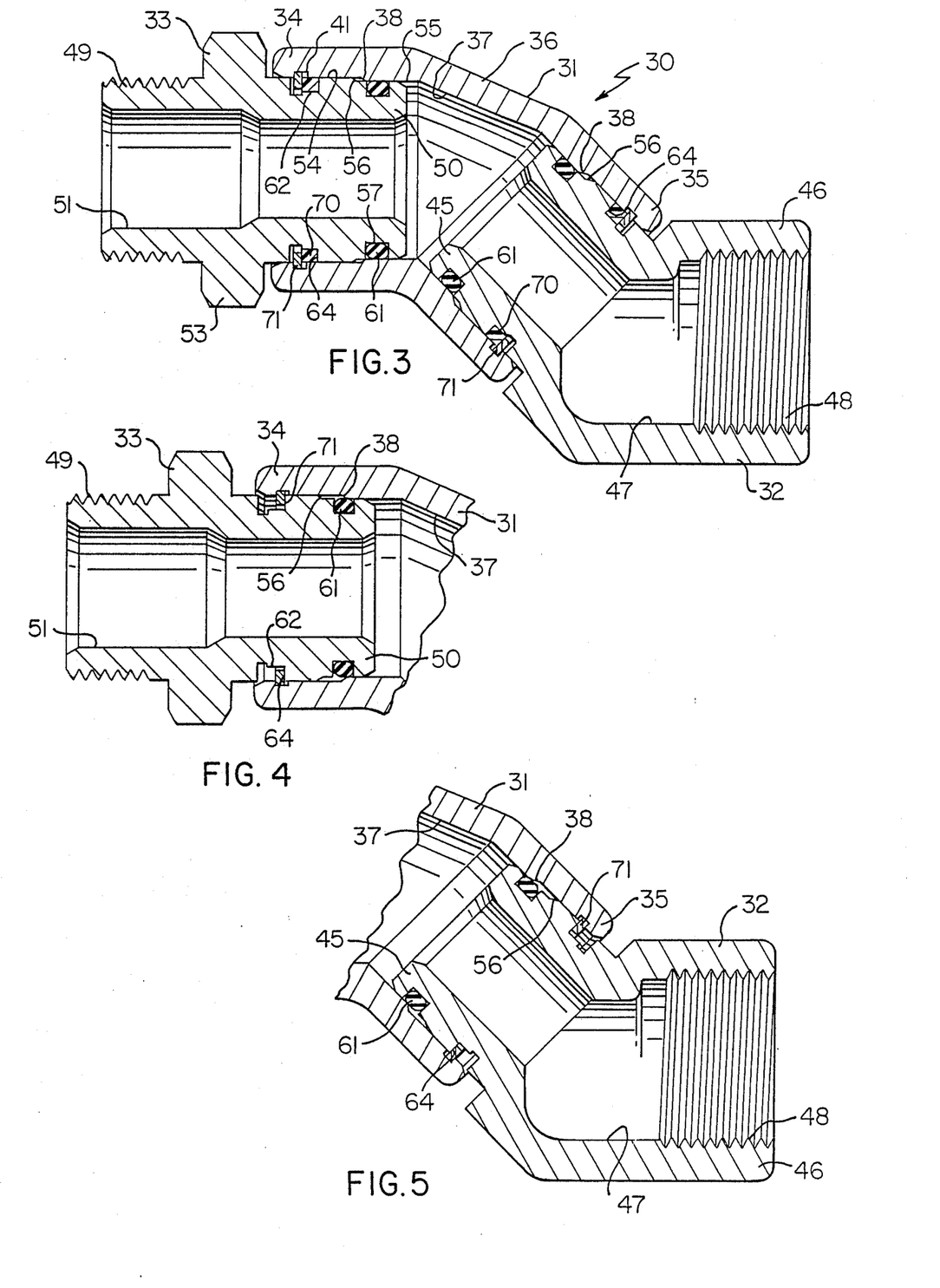
FIG. 3 is an enlarged cross-sectional view taken on line 3—3 of FIG. 1.
FIG. 4 is a fragmentary view of one end of the swivel construction of FIG. 3 and illustrates the same after the bearing means has been worn away.
FIG. 5 is a fragmentary view of the other end of the swivel construction of FIG. 3 and illustrates the same after the bearing means thereof has been worn away.

Referring now to FIGS. 1–3, the swivel construction of this invention is generally indicated by the reference numeral 30 and comprises a body member 31, an inlet adaptor member 32 and an outlet adaptor member 33 interconnected together in a manner hereinafter set forth so that the adaptor members 32 and 33 are adapted to swivel on the body member 31 for any desired purpose, such as by having the inlet adaptor member 32 interconnected to a gasoline supply hose and having the outlet adaptor member 33 interconnected to a dispensing nozzle construction that is utilized for dispensing fuel into the fill pipes of the gasoline storage tanks on automobiles and the like at conventional filling stations and the like. For example, see the aforementioned U.S. patent to Moore et al, U.S. Pat. No. 3,558,163 and the U.S. patent to Rabinovich, U.S. Pat. No. 4,611,834 which illustrate and describe such use whereby these two patents are being incorporated into this disclosure by this reference thereto.

Therefore, since the use of a swivel construction is well known in the art, a further discussion of the use and operation thereof need not be set forth.

However, as previously set forth, it is a feature of this invention to have the swivel construction 30 of this invention signal to the user thereof that certain parts thereof have worn out to a degree thereof that the swivel construction 30 should be replaced, such signaling means of this invention comprising a leakage of a certain amount of fluid out of the swivel construction 30 as will be apparent hereinafter.

The body member 31 of the swivel construction 30 has a pair of opposed ends 34 and 35 that are disposed at an angel relative to each other by an intermediate portion 36 of the body member 31 and respectively have a passage means 37 of the body member 31 passing therethrough, the ends 34 and 35 being formed in a like manner and configuration so that only the end 34 will be further described as like reference numerals will be applied to like parts on the end 35 thereof.

Figure 6:
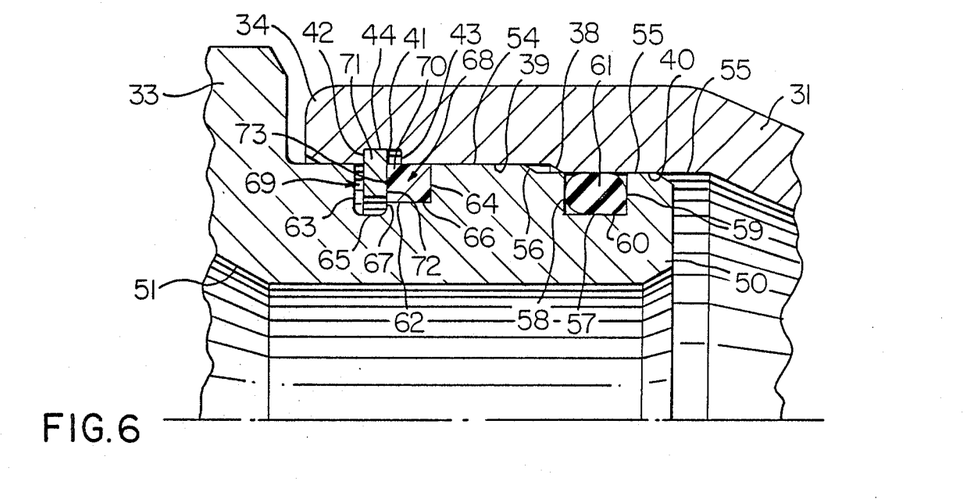
FIG. 6 is an enlarged fragmentary view of one pair of the telescoping ends of the swivel construction of FIG. 3 and illustrates the same in a relatively new condition thereof.

As illustrated in FIGS. 3 and 6, the passage 37 through the end 34 of the body member 31 defines an angled or bevelled annular internal shoulder 38 intermediate two internal peripheral surfaces 39 and 40 which are respectively substantially circular in transverse cross-sectional configuration through the axial length thereof with the surface 39 having a larger diameter than the surface 40 as illustrated.

An annular groove 41 is formed in the end 34 of the body member 31 to interrupt the surface 39 thereof and define a pair of facing annular shoulder means 42 and 43 being spaced apart by an internal peripheral surface 44 of the groove 41 as illustrated.

While the body member 31 can be formed of any suitable material and in any suitable manner, one working embodiment thereof comprises die cast aluminum.

The inlet adaptor member has opposed ends 45 and 46 angled relative to each other as illustrated and has an internal passage means 47 passing through the ends 45 and 46 thereof, the end 46 being internally threaded with threads 48 for threadedly connecting the fuel supply hose in a manner well known in the art.

The outlet adaptor member 33 has a pair of opposed ends 49 and 50 disposed in aligned relation and having an internal passage 51 passing therethrough as illustrated, the end 49 being externally threaded with threads 52 for interconnecting to a fluid dispensing nozzle construction in a manner well known in the art. The outlet adaptor member 33 has an external hex-like portion 53 intermediate the ends 49 and 50 thereof to facilitate the threading of the end 33 into the aforementioned fluid dispensing nozzle construction in a manner well known in the art.

While the adaptor members 32 and 33 can be formed of any suitable material in any suitable manner, in one working embodiment thereof the same each comprises die cast zinc.

Since the end 50 of the outlet adaptor member 33 is constructed in the same manner as the end 45 of the inlet adaptor member 32, only the end 50 of the adaptor member 33 and its interconnection with the end 34 of the body member 31 will now be described and like reference numeral will be utilized on like parts of the end 45 of the inlet adaptor member 32.

As illustrated in FIGS. 3 and 6, the end 50 of the outlet adaptor member 33 is defined by two substantially cylindrical external surfaces 54 and 55 that are separated by an angular or bevelled external annular shoulder 56, the surfaces 54 and 55 respectively having substantially circular transverse cross-sectional configurations throughout the axial lengths thereof with the surface 54 being defined by a larger diameter than the surface 55. The diameter of the external surface 54 is only slightly less than the diameter of the internal surface 39 of the body member 31 and the diameter of the external surface 55 is only slightly less than the diameter of the internal surface 40 of the body member 31 so that the end 50 of the adaptor member 33 is adapted to be telescopically disposed within the end 34 of the body member 31 in the manner illustrated in FIG. 6.

An annular groove 57 is formed in the external surface 55 of the adaptor member 33 and defines a pair of facing annular shoulders 58 and 59 spaced apart by an annular peripheral surface 60 that forms the bottom of the groove 57 as illustrated.

A flexible sealing O-ring 61 of any suitable material is disposed in the annular groove 57 after being stretched over the end 50 and is of such a configuration that the same normally extends radially outwardly beyond the surface 55 of the adaptor member 33 but when the end 50 is fully telescopically disposed within the end 34 of the body member 31 as illustrated in FIG. 6, the seal member 61 is inwardly radially compressed by the internal surface 40 of the body member 31 so as to fully seal against the same and thereby normally prevent fluid leakage between the interconnected passages 37 and 51 at the telescoped ends 34 and 50 of the members 31 and 33 while permitting swivel movement between the members 31 and 33 as is well known in the art.

Another annular groove 62 is formed in the end 50 of the adaptor member 33 except that the same interrupts the larger external peripheral surface 54 thereof and defines two annular facing shoulders 63 and 64 that are spaced apart by a bottom of the groove 62 that is defined by two internal peripheral surfaces 65 and 66 that are in stepped relation that defines an annular shoulder 67 that faces the annular shoulder 63 in spaced relation thereto. In this manner, the annular grooves 62 has two portions 68 and 69 with the portion 69 being deeper than the portion 68 for a purpose hereinafter set forth.

An annular bearing means or member 70 is disposed in the portion 68 of the groove 62 so as to rest on the bottom 66 thereof and originally extends from approximately the shoulder 68 to the shoulder 64 as illustrated in FIG. 6 while having an outer peripheral surface that is substantially flush with the external surface 54 of the end 50 of the adaptor member 33. While the bearing means 70 can comprise any suitable material formed in any suitable manner, the same comprises a polymeric material, such as plastic material, and in one working embodiment of the swivel construction of this invention, the bearing means 70 comprises a self-lubricating plastic material sold under the trade name or trademark "Zytel" by the E. I. Dupont Corporation of Wilmington, Del.

The bearing means 70 has a notch or cutout 70' therein that readily permits the same to be spread enough to telescope over the end 50 of the adaptor member 33 and be received into the groove 62 and return to its original shape. However, the notch or cutout 70' is of such a size that it permits the material of the bearing means to swell due to climatic conditions and/or contact with chemicals without causing any binding force that would impede the rotational movement or swivel action of the adaptor member 33 and the body member 31.

An annular split ring retaining means or member 71 is utilized to retain the telescoped ends 34 and 50 of the members 31 and 33 together while permitting swivel movement therebetween and is so constructed and arranged that the same is adapted to be initially disposed in the portion 69 of the groove 62 and have the side 72 thereof bear against the side 73 of the bearing means 70 during the swivel movement between the members 31 and 33 and while pressurized fluid is in the swivel construction 30 as such pressurized fluid tends to separate the members 31 and 33 from each other as is well known in the art. Normally, the retaining means 71 has an external diameter that causes the retaining means 71 to be fully received in the annular groove 41 of the body member 31 in the manner illustrated in FIG. 6 to hold the two members 31 and 33 together. However, the dimensions of the retaining means 71 are such that the retaining means 71 can be radially inwardly collapsed into the portion 69 of the groove 62 of the adaptor member 33 to permit the retaining ring 71 to be inserted into the end 34 of the body member 31 and clear the surface 39 thereof until the end 50 of the adaptor member 33 has been inserted into the end 34 of the body member 31 a sufficient distance to permit the retaining ring 71 to outwardly extend into the annular groove 41 of the body member 31 as illustrated in FIG. 6.

If desired, a stop ring could be initially inserted in the body member 31 to limit the degree of insertion of the end 50 of the adaptor member 33 therein. For example, such stop rings are illustrated in FIGS. 9-16.

While the retaining means 71 can be formed of any suitable material and in any suitable manner, in one working embodiment of the swivel construction 30 of this invention, the retainer means 71 comprises a split steel ring that has been plated with zinc and can be expanded to permit the same to be slipped over the end 50 of the adaptor member 33 and then be released at the groove portion 69 to be snap-fitted therein as illustrated.

When making a swivel construction 30 of this invention by the method of this invention, the O-ring 61, bearing means 70 and retainer ring 71 are respectively inserted in the annular grooves 57 and 62 of the adaptor member 33 as previously set forth and thereafter the end 50 of the adaptor member 33 is inserted into the end 34 of the body member 31 until the snap retainer ring 71 can snap radially outwardly into the groove 41 of the body member 31 in the manner illustrated in FIG. 6. At this time, the O-ring seal means 61 is in full sealing engagement with the internal peripheral surface 40 of the body member 31 and the swivel construction appears in the newly constructed manner as illustrated in FIGS. 3 and 6. The end 45 of the adaptor member 32 is likewise inserted into the end 35 of the body member 31 as illustrated in FIG. 3 whereby the swivel construction 30 is complete and can be utilized in a conventional manner as the retaining means 71 maintains the members 31, 32 and 33 in their assembled relation and the sealing means 61 seals the same together so that the fluid flowing through the swivel construction 30 will not normally leak out of the same even though swivel movement is provided between the members 31-33.

However, as previously set forth, during the swiveling movement there is a tendency of the retainer rings 71 to wear out the bearing material 70 as the surfaces 72 and 73 thereof work against each other during the aforementioned swiveling movement because the internal pressure within the swivel construction 30 continuously forces the surfaces 72 and 73 together with a certain force.

Figure 7:
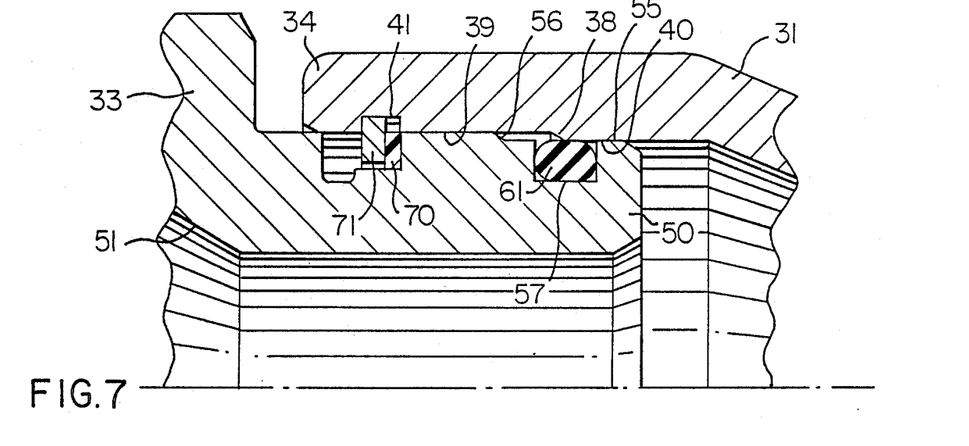
FIG. 7 is a view similar to FIG. 6 and illustrates the swivel construction after the bearing means has worn away to a degree thereof that substantially initially causes the seal means to leak a certain amount of fluid therethrough.

Therefore, the shoulder 38 has been so positioned according to the teachings of this invention that as the bearing material 70 wears away in the manner illustrated in FIG. 7 and sometime before the bearing material 70 completely wears away, the shoulder 38 eventually overlies the center of the O-ring 61 because of the untelescoping movement of the members 31 and 33 whereby further untelescoping movement of the members 31 and 33 through further wearing out of the bearing material 70 will cause the shoulder 38 to be further moved beyond the center of the seal means 61 so that the seal means 61 will begin to leak fluid from within the swivel construction 30 out past the seal means 61 and the bearing and retainer means 70 and 71 to the exterior of the swivel construction 30 so as to signal that the bearing material 70 is about to be completely worn out. However, at this time, the retaining means 71 is still maintaining the members 31 and 33 together and the amount of leakage is not too great but is sufficient for signalling purposes.

Figure 8:
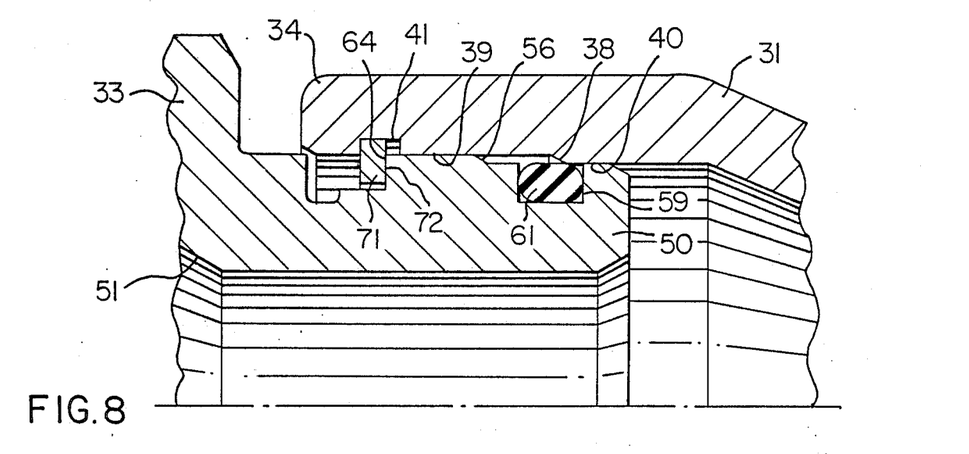
FIG. 8 is a view similar to FIG. 6 and illustrates the swivel construction after the bearing means has been completely worn away.
Figure 9:
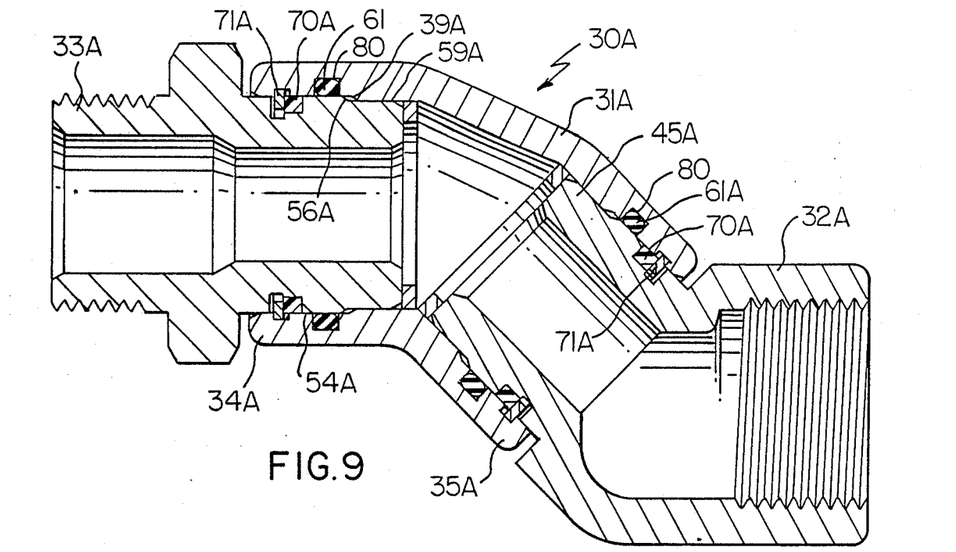
FIG. 9 is a view similar to FIG. 3 and illustrates another embodiment of the swivel construction of this invention.
Figures 10, 11, 12:
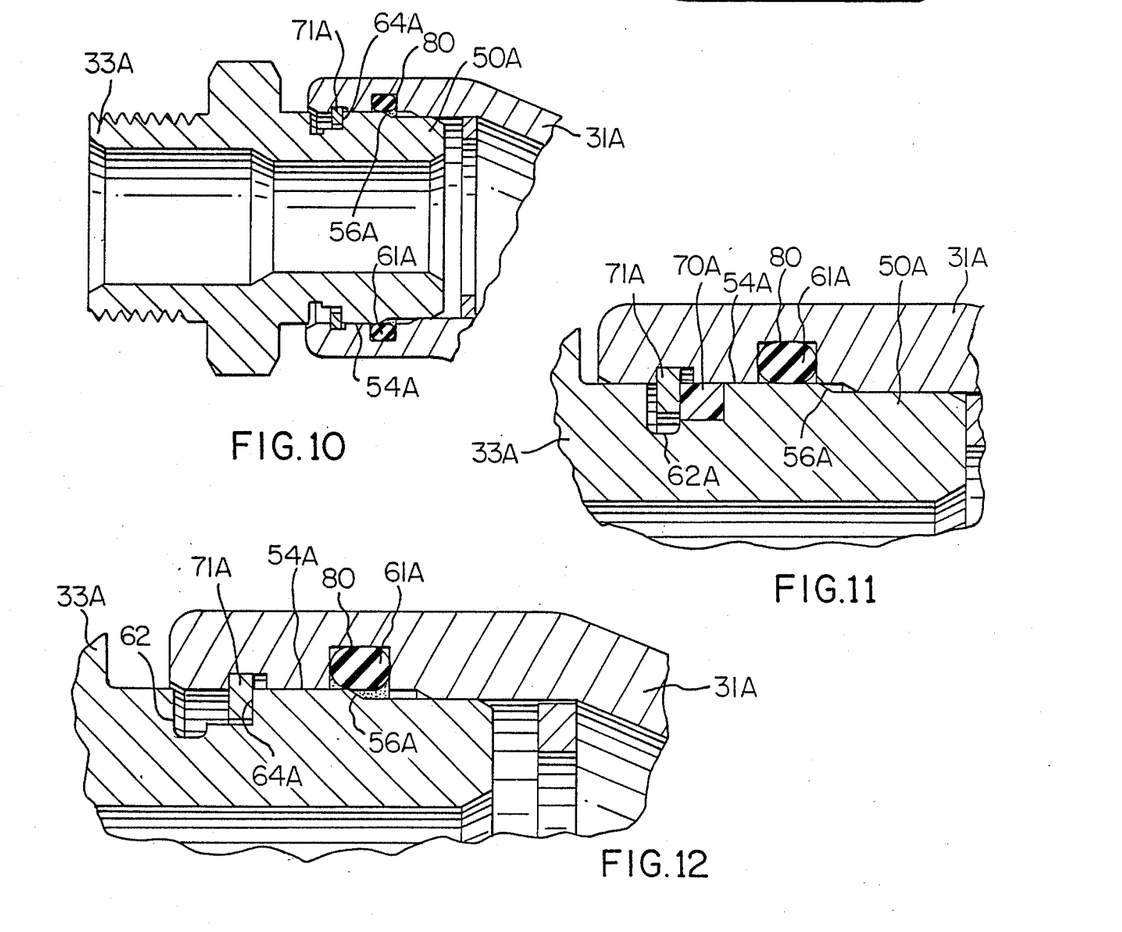
FIG. 10 is a fragmentary view of one pair of the telescoped ends of the swivel construction of FIG. 9 and illustrates the bearing means after the same has been completely worn away.
FIG. 11 is an enlarged view similar to FIG. 6 and illustrates one pair of the telescoped ends of the swivel construction of FIG. 9 in a relatively new condition thereof.
FIG. 12 is a view similar to FIG. 11 and illustrates the telescoped ends after the bearing means has been completely worn away.

Should the bearing material 70 be completely worn out in the manner illustrated in FIG. 8, it can be seen that the retaining means 71 is now abutting against the shoulder 64 of the adaptor member 33 so as to prevent the adaptor member 33 from pulling out of the body member 31. In fact, all the material between the retaining ring 71 and the seal means 61, as well as the seal means 61, can be completely worn away and the retaining ring 71 will then abut against the shoulder 59 of the adaptor member 33 to still tend to hold the adaptor member 33 and the body member 31 together.

However, before this last situation occurs, it can be seen that a full flow of leaking fluid will pass out of the swivel construction 30 to be fully detected by the user thereof and warn that the same should be completely replaced for the reasons previously set forth.

Therefore, it can be seen that the swivel construction 30 of this invention has means 38 for causing the seal means 61 at the ends 50 and 34 of the members 33 and 31 to leak a certain amount of fluid from the interior of the swivel construction 30 to the exterior thereof after the retaining means 72 has worn away the respective bearing means 70 a certain amount but is still maintaining the ends 50 and 34 of the members 33 and 31 in the telescoped relation thereof. Such control of the retaining means 71 and seal means 61 is likewise provided for the adaptor member 32 and the body member 31 so that a further discussion of the operation thereof is deemed unnecessary.

Of course, it is to be understood that there may be situations where the seal means 61 itself wears out long before the bearing means 70 wears out so that a leakage of fluid will be provided through the swivel construction 30 by the worn out sealing means 61 which will also signal the need to replace the swivel construction 30.

While the swivel construction 30 has the O-ring sealing member 61 carried by the adaptor members 32 and 33, it is to be understood that the sealing means 61 could be carried by the body member 31 if desired.

For example, reference is now made to FIGS. 9–12 wherein another embodiment of the swivel construction of this invention is generally indicated by the reference numeral 30A and parts thereof similar to the swivel construction 30 previously described are indicated by like reference numerals followed by the reference letter "A".

As illustrated in FIGS. 9–12, the ends 34A and 35A of the body member 31A are identical to each other and the ends 45A and 50A of the members 32A and 33A are identical to each other with the ends 45A and 50A respectively carrying the bearing means 70A and retainer rings 71A in the manner previously described. However, the ends 34A and 35A of the body member 31A have annular grooves 80 respectively interrupting the internal peripheral surfaces 39A thereof and respectively receiving O-ring sealing members 61A therein which will respectively seal against the external peripheral surfaces 54A of the adaptor members 32A and 33A as illustrated. It can be seen that the shoulder means 56A of the adaptor members 32A and 33A now provide the same leak signalling functions as the shoulders 38 previously described so that the shoulders 56A permit the seal means 61A to leak when the bearing material 70A wears away in the manner illustrated in FIG. 12 to thereby provide a signal that the swivel construction 30A needs to be replaced as previously set forth.

If desired, the extreme end shoulders of the members 32A and 33A could be utilized as the cooperating shoulder means by mounting the seal means in another position in the body member of the swivel construction of this invention.

In particular, reference is now made to FIGS. 13–16 wherein another embodiment of the swivel construction of this invention is generally indicated by the reference numeral 30B and parts thereof similar to the swivel construction 30 previously described are indicated by like reference numerals followed by the reference letter "B".

Figure 13:
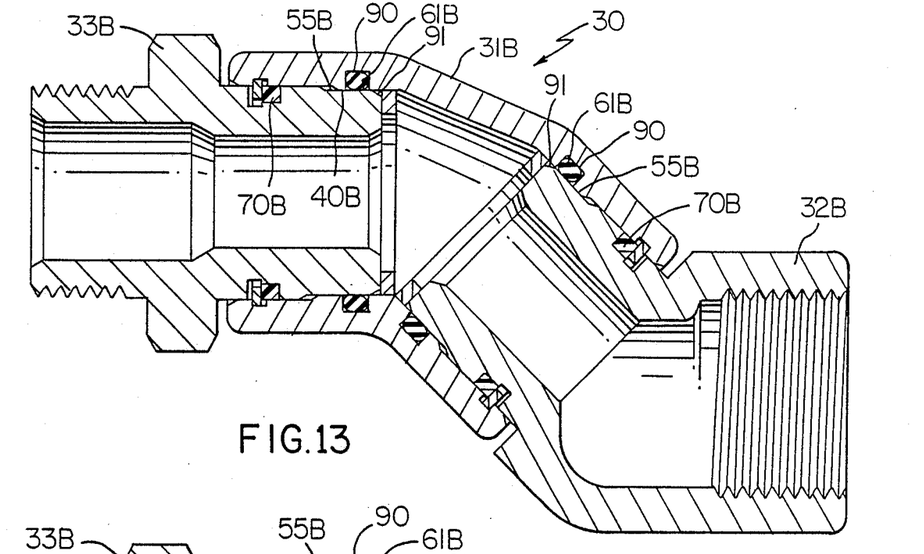
FIG. 13 is a view similar to FIG. 3 and illustrates another embodiment of the swivel construction of this invention.
Figures 14, 15, 16:
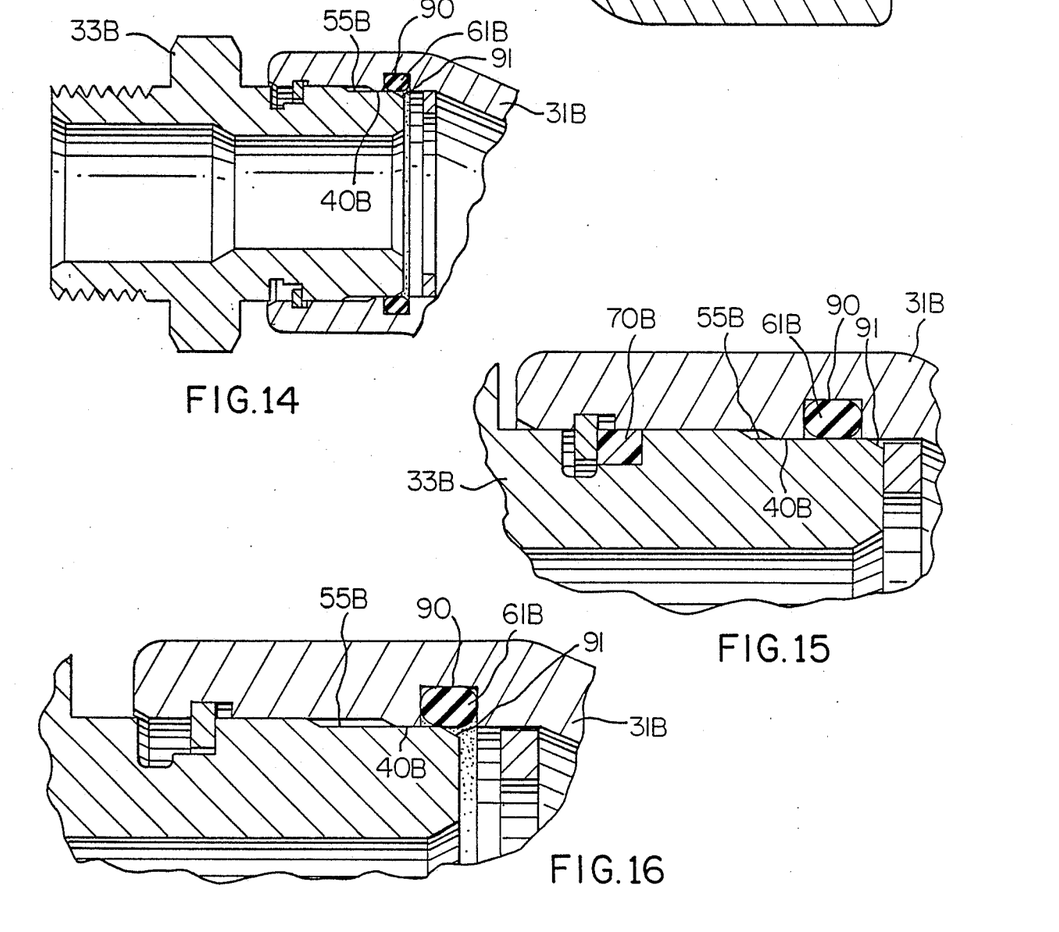
FIG. 14 is a fragmentary view of one pair of the telescoped ends of the swivel construction of FIG. 13 and illustrates the same after the bearing means has been worn away.
FIG. 15 is an enlarged view similar to FIG. 6 and illustrates one pair of the telescoped ends of the swivel construction of FIG. 13 while the parts thereof are in a relatively new condition thereof.
FIG. 16 is a view similar to FIG. 15 and illustrates the parts of the swivel construction after the bearing means has been completely worn away.

As illustrated in FIGS. 13–16, the swivel construction 30B is substantially the same as the swivel construction 30A previously described except that annular grooves 90 are formed in the internal peripheral surfaces 40B of the body member 31B so as to have the sealing means 61B disposed therein and respectively seal against the external peripheral surface 55B of the members 32B and 33B as illustrated in FIGS. 13 and 15. However, as the bearing material 70B wears out in the manner illustrated in FIG. 16, the end bevelled shoulder means 91 cooperates with the seal means 61B in the same manner as the shoulder means 38 and 56B previously described to cause the seal means 61B to leak a certain amount of fluid from the interior of the swivel construction 30B to the exterior thereof so as to signal that the bearing material 70B has worn away a certain amount so that the swivel construction 30B needs replacing as previously set forth.

While the swivel construction 30A and 30B have the bearing material and retaining means still carried by the respective adaptor members, it is to be understood that the bearing material and retaining means could also be carried by the body member of the swivel construction of this invention if desired.

In particular, reference is now made to FIGS. 17–20 wherein another embodiment of the swivel construction of this invention is generally indicated by the reference numeral 30C and parts thereof similar to the swivel construction 30 previously described are indicated by like reference numerals followed by the reference letter "C".

Figures 17, 18, 19, 20:
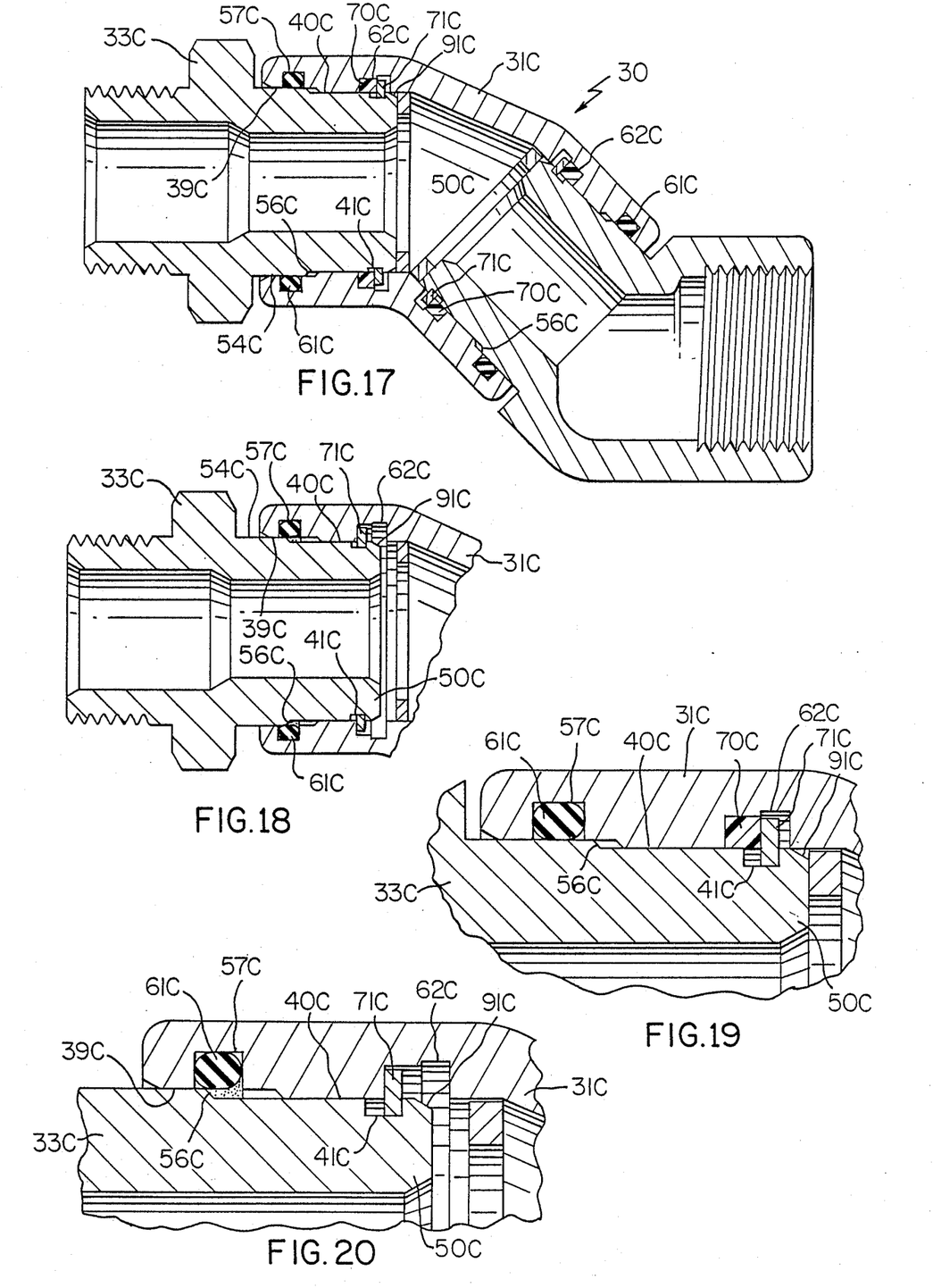
FIG. 17 is a view similar to FIG. 13 and illustrates another embodiment of the swivel construction of this invention.
FIG. 18 is a fragmentary view of one pair of the telescoped ends of the swivel construction of FIG. 17 and illustrates the parts thereof after the bearing means has been completely worn away.
FIG. 19 is a view similar to FIG. 6 and illustrates one pair of the telescoped ends of the swivel construction of FIG. 13 while the same are in a relatively new condition thereof.
FIG. 20 is a view similar to FIG. 19 and illustrates the parts thereof after the bearing means has been completely worn away.

As illustrated in FIGS. 17 and 19, an annular groove 62, similar to the annular groove 62 previously described, is formed in the internal peripheral surface 39C of the body member 31C and contains the bearing material 70C and retainer 71C therein while the surface 40C of the adaptor member 33C has the annular groove 41C formed therein in just the reverse manner of the cooperating grooves 62 and 41 of the swivel construction 30 previously described. In addition, the grooves 62C and 41C are arranged toward the end bevelled surface 91C of the adaptor member 31C.

In addition, the internal peripheral surfaces 39C of the body member 31C has the groove 57C formed therein so as to receive the sealing means 61C therein that will seal against the surface 54C of the adaptor member 33C as illustrated so that the shoulder means 56C now performs the leak providing function with the seal means 61C in the same manner as the previously described shoulder 38 as is evidenced by the condition illustrated in FIG. 20.

If desired, the bevelled end 91C can be so shaped relative to the retainer 71C that the same is adapted to cam through the retainer 71C and permit the same to radially expand as the end 50C of the adaptor member 33C is being initially inserted into the end 34C of the body member 31C during the assembly operation thereof as is fully understood from the drawings.

Therefore, while the bearing means 70C and retainer means 71C are now upstream of the seal means 61C so as to provide a wet arrangement thereof, rather than the dry arrangement thereof when the same are downstream of the seal means in the embodiments illustrated in FIGS. 1–16, nevertheless, the seal means 61C function to seal the swivel construction 30C until the bearing means 70C has been worn away a certain amount so as to provide a leakage path therethrough for signaling that the bearing means 70C has been worn away a certain amount as previously set forth.

Therefore, it can be seen that this invention not only provides a new swivel construction, but also this invention provides a new method of making such a swivel construction.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

We claim:

1. In a swivel construction comprising a body member and an adaptor member, each said member having opposed ends and having a passage passing through said ends thereof, one end of said body member and one end of said adaptor member being disposed in telescoped relation, said construction having retaining means disposed between said telescoped ends and tending to hold said members in said telescoped relation while permitting swivel movement therebetween, said construction having seal means disposed between said telescoped ends and tending to seal said telescoped ends together while permitting swivel movement therebetween, the improvement wherein said construction has bearing means disposed between said telescoped ends and intermediate said retaining means and said seal means and wherein said construction has means for causing said seal means to leak a certain amount after said retaining means has worn away said bearing means a certain amount but is still maintaining said one ends in said telescoped relation thereof, one of said members having an annular groove therein, said bearing means comprising an annular part disposed in said groove, said bearing means having said annular part thereof provided with a split therein that permits said annular part to be deformed for insertion into said annular groove and then return to its original shape in said annular groove, said split of said annular part of said bearing means providing a gap in said bearing means that permits said bearing means to swell in said annular groove due to climatic conditions and/or contact with chemicals without causing any adverse binding between said body member and said adaptor member during swivel movement therebetween.

2. A swivel construction as set forth in claim 1 wherein said means for causing said seal means to leak comprises an annular shoulder means on one of said members.

3. A swivel construction as set forth in claim 2 wherein said seal means comprises an annular flexible O-ring, said shoulder means engaging said O-ring in a certain position to provide said leak when said bearing means has been worn away said certain amount.

4. A swivel construction as set forth in claim 3 wherein said adaptor member has an other annular groove in said one end thereof, said O-ring being carried in said other annular groove.

5. A swivel construction as set forth in claim 3 wherein said body member has an other groove in said one end thereof, said O-ring being carried in said other annular groove.

6. A swivel construction as set forth in claim 1 wherein said bearing means is formed of polymeric material.

7. A swivel construction as set forth in claim 1 wherein said bearing means has a substantially rectangular longitudinal cross-sectional configuration.

8. A swivel construction as set forth in claim 1 wherein said one end of said adaptor member is telescopically disposed within said one end of said body member.

9. A swivel construction as set forth in claim 1 wherein said retaining means comprises an annular part also disposed in said annular groove.

10. A swivel construction as set forth in claim 9 wherein said annular groove has a step therein.

11. A swivel construction as set forth in claim 9 wherein said one of said members comprises said body member.

12. A swivel construction as set forth in claim 9 wherein said one end of said members comprises said adaptor member.

13. A swivel construction as set forth in claim 1 wherein one of said members carries said bearing means and said seal means in spaced apart relation.

14. A swivel construction as set forth in claim 13 wherein said one of said members comprises said adaptor member.

15. A swivel construction as set forth in claim 13 wherein said one of said members comprises said body member.

16. A swivel construction as set forth in claim 1 wherein one of said members carries said bearing means and the other of said members carries said seal means.

17. In a swivel construction comprising a body member and an adaptor member, each said member having opposed ends and having a passage passing through said ends thereof, one end of said body member and one end of said adaptor member being disposed in telescoped relation, said construction having retaining means disposed between said telescoped ends and tending to hold said members in said telescoped relation while permitting swivel movement therebetween, said construction having seal means disposed between said telescoped ends and tending to seal said telescoped ends together while permitting swivel movement therebetween, the improvement wherein said construction has bearing means disposed between said telescoped ends and intermediate said retaining means and said seal means and wherein said construction has means for causing said seal means to leak a certain amount after said retaining means has worn away said bearing means a certain amount but is still maintaining said one ends in said telescoped relation thereof, said adaptor member having an annular groove therein said bearing means comprising an annular part disposed in said groove, said bearing means having said annular part thereof provided with a split therein that permits said annular part to be expanded for assembly over part of said adaptor member and return to its original shape in said annular groove, said split of said annular part of said bearing means providing a gap in said bearing means that permits said bearing means to swell in said annular groove due to climatic conditions and/or contact with chemicals without causing any adverse binding between said body member and said adaptor member during swivel movement therebetween.

18. In a swivel construction comprising a body member and two adaptor members, each said member having opposed ends and having a passage passing through said ends thereof, said ends of said body member and adjacent ends of said adaptor members being respectively disposed in telescoped relation, said construction having retaining means disposed between each pair of said telescoped ends and tending to hold said members in said telescoped relation while permitting swivel movement therebetween, said construction having seal means disposed between each pair of said telescoped ends and tending to seal said telescoped members together while permitting swivel movement therebetween, the improvement wherein said construction has bearing means disposed between each pair of said telescoped ends and intermediate said retaining means and said seal means thereof and wherein said construction has means for causing each said seal means to leak a certain amount after its said retaining means has worn away its said bearing means a certain amount but is still maintaining its respective ends in said telescoped relation thereof, one of said members of each pair of said telescope ends having an annular groove therein, each said bearing means comprising an annular part disposed in said groove of its respective pair of said telescoped ends, each said bearing means having said annular part thereof provided with a split therein that permits said annular part to be deformed for insertion into its respective said annular groove and then return to its original shape in its respective annular groove, each said split of said annular part of said bearing means providing a gap in said bearing means that permits said bearing means to swell in its respective said annular groove due to climatic conditions and/or contact with chemicals without causing any adverse binding between said body member and its respective said adaptor member during swivel movement therebetween.

* * * * *